(12) United States Patent
Baumann et al.

(10) Patent No.: US 6,438,482 B1
(45) Date of Patent: Aug. 20, 2002

(54) VEHICLE STABILIZING DEVICE AND METHOD FOR MODIFYING BRAKE PRESSURES

(75) Inventors: Mathias Baumann, Herrenberg; Torsten Herrmann, Frankfurt am Main; Marc Haussmann, Frankfurt; Ralph Klingel, Wimsheim, all of (DE)

(73) Assignees: Continental Teves AG & Co., OHG, Frankfurt; Daimler Chrysler AG, Stuttgart,., both of (DE)

(*) Notice: Subject to any disclaimer, the term of this patent is extended or adjusted under 35 U.S.C. 154(b) by 0 days.

(21) Appl. No.: 09/674,765

(22) PCT Filed: May 11, 1999

(86) PCT No.: PCT/EP99/03224

§ 371 (c)(1),
(2), (4) Date: May 25, 2001

(87) PCT Pub. No.: WO99/58382

PCT Pub. Date: Nov. 18, 1999

(30) Foreign Application Priority Data

May 12, 1998 (DE) .......................................... 198 21 179

(51) Int. Cl.[7] ................................................. B60T 8/58
(52) U.S. Cl. ............................. 701/70; 701/75; 701/78; 303/154
(58) Field of Search .............................. 701/70, 75, 78; 303/140, 154, 155, 156, 157, 167, 146

(56) References Cited

U.S. PATENT DOCUMENTS 5,735,584 A * 4/1998 Eckert .......................... 303/140

FOREIGN PATENT DOCUMENTS

EP 0 771 707 5/1997

* cited by examiner

Primary Examiner—William A. Cuchlinski, Jr.
Assistant Examiner—Arthur D. Donnelly
(74) Attorney, Agent, or Firm—Rader, Fishman & Grauer PLLC

(57) ABSTRACT

The present invention relates to a vehicle stabilizing device and a method for modifying brake pressures on wheels of a vehicle according to input data. To achieve an optimum from the driver's desire to brake, the vehicle stabilization, the steerability of the vehicle, and from the pedal and sound comfort, the present invention discloses a variation of the brake pressures on at least one wheel according to a way of influencing an intervention unit that provides a plurality of influencing cycles or influencing strategies, the said influencing being determined by the brake pressure effected by the driver.

22 Claims, 4 Drawing Sheets

VEHICLE STABILIZING DEVICE AND METHOD FOR MODIFYING BRAKE PRESSURES

The present invention relates to a vehicle stabilizing device and a method according to the preamble of claim 1 and 13, respectively.

1. PRIOR ART

The basic ESP-strategy (Electronic Stability Program) for stabilizing a vehicle in the unbraked case relates to the specific deceleration of individual wheels by an active pressure buildup in the corresponding wheel brake cylinder. A stabilizing torque (yaw torque) is thereby imparted to the vehicle structure by decrease of lateral force and simultaneous increase in longitudinal force or brake force. In contrast to the unbraked case, an existing initial pressure distribution and, thus, force distribution on the wheels must be based on for the introduction of a stabilizing yaw torque, during simultaneous braking by the driver, the said distribution being caused by the driver's initial pressure or, if necessary, by the pressure level introduced by the ABS (anti-lock system).

2. DESCRIPTION

An object of the present invention is to provide a braking strategy which permits stabilizing a vehicle in the actively braked case with pressure increase so that an optimum is achieved that is made up of the driver's wish to brake, the vehicle stabilization or steerability of the vehicle and the pedal and sound comfort.

This object is achieved in a generic device by the features of claim 1 and in a generic method by the features of claim 1* (*Translator's note: claim '13' is most likely referred to).

The provision of a vehicle stabilizing device for modifying brake pressures on wheels of a vehicle according to input data which performs a variation of the brake pressures on at least one wheel according to a way of influencing an intervention unit that provides a number of influencing cycles or influencing strategies, permits achieving a stabilization of the vehicle with an optimum possible deceleration as long as possible by means of the prevailing driver's initial pressure without active pressure buildup beyond this pressure level, the above influencing being defined by the driver brake pressure.

The great advantage of the pressure modulations below the driver's initial pressure is that they allow to be carried out in a way which is very comfortable for the driver. Thus, the separating valves (TCS 1/2) used in a vehicle stabilizing device (for example, as disclosed in DE 19816290) remain open in this condition range and the switch-over valves (SV 1/2) remain closed so that no pedal reactions will be caused and noise will not develop due to the intervention which might minimize the comfort of the driver.

In addition, the pressure increase requirement in the second influencing cycle is equal to the driver's initial pressure so that, beside the separating and switch-over valve, also the inlet valve of the corresponding wheel remains permanently open, with the result of further improvement of the pedal comfort.

The present invention also relates to a vehicle stabilizing method for modifying brake pressures on wheels in a vehicle according to input data, wherein the brake pressures on at least one wheel are varied according to a way of influencing which is selected from several influencing cycles or influencing strategies, the said influencing being defined by the brake pressure effected by the driver.

Favorable embodiments of the present invention are indicated in the subclaims.

The present invention permits greatly improving the effectiveness of the intervention and the comfort compared to the previous intervention. More specifically, pressure reduction on the curve-outward wheel in the understeering case causes buildup of cornering forces which decisively improve the steerability of the vehicle and its stabilization. The simultaneous pressure increase on the curve-inward rear wheel allows limiting the reduced deceleration due to the pressure increase on the front wheel. Preventing the pressure increase beyond the driver's initial pressure and, hence, circumventing the energization of the separating and switch-over valve, especially in the event of minor to medium vehicle instabilities, enhances comfort during the intervention.

This arrangement specifically focuses on the improvement of comfort in ESP interventions with medium and small vehicle instability by avoiding a pressure increase in excess of the driver's initial pressure.

One embodiment of the present invention is shown in the drawings and will be described in detail hereinbelow.

2.0 Intervention Strategy

Figure 1:
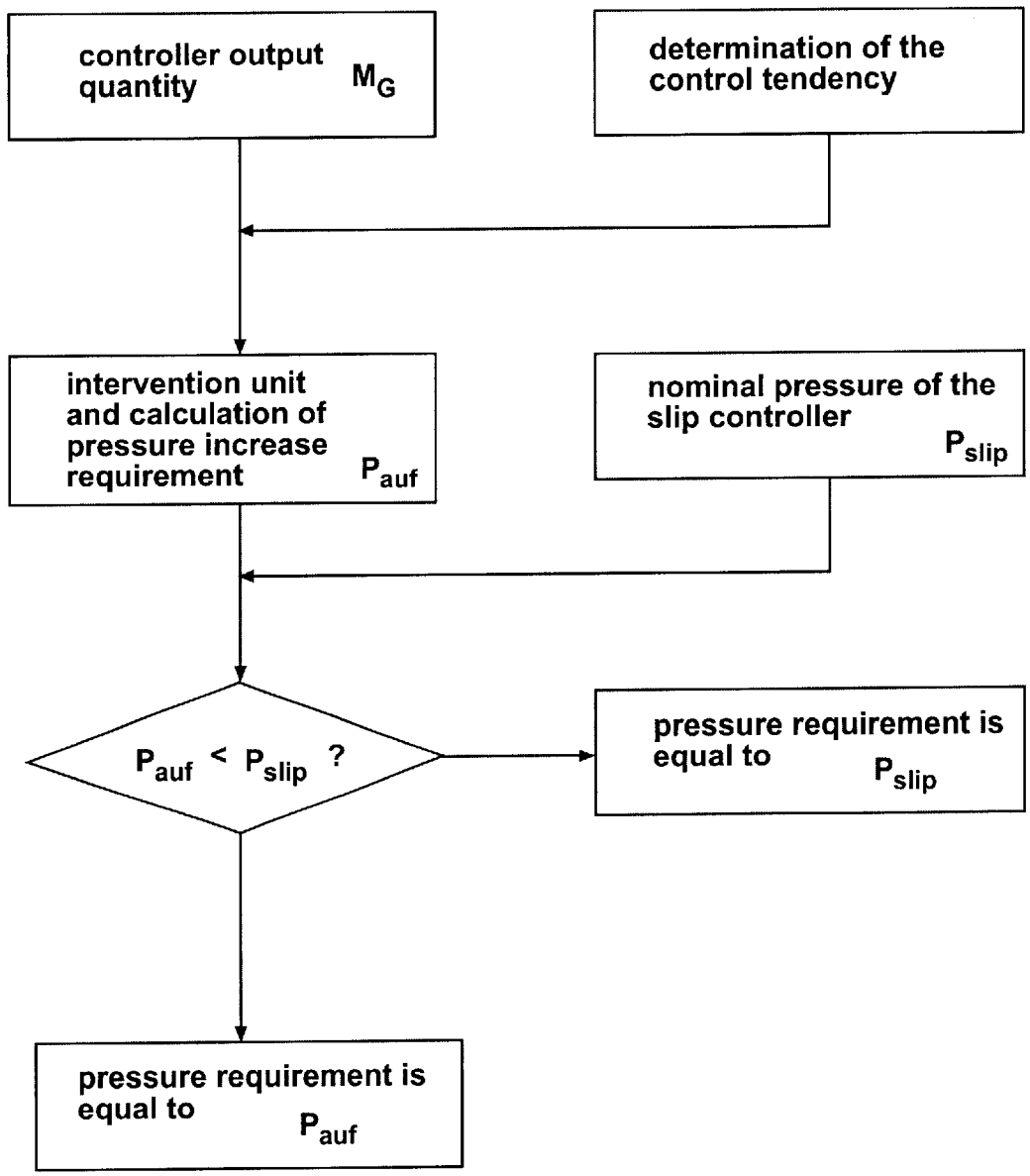
FIG. 1 shows a pattern of the basic elements of the pressure requirement from the controller quantity MG.

The condition without pressure reduction is described for better explanation of the ESP intervention in the actively braked case with pressure reduction. FIG. 1 illustrates an overview over the essential calculation steps starting from the controller's output quantity MG (torque or yaw torque) until the determination of the pressure requirement $P_{auf}$ and will be described in the following sections.

2.1 Calculation of the Controller's Output Quantity $M_G$

Figure 2:
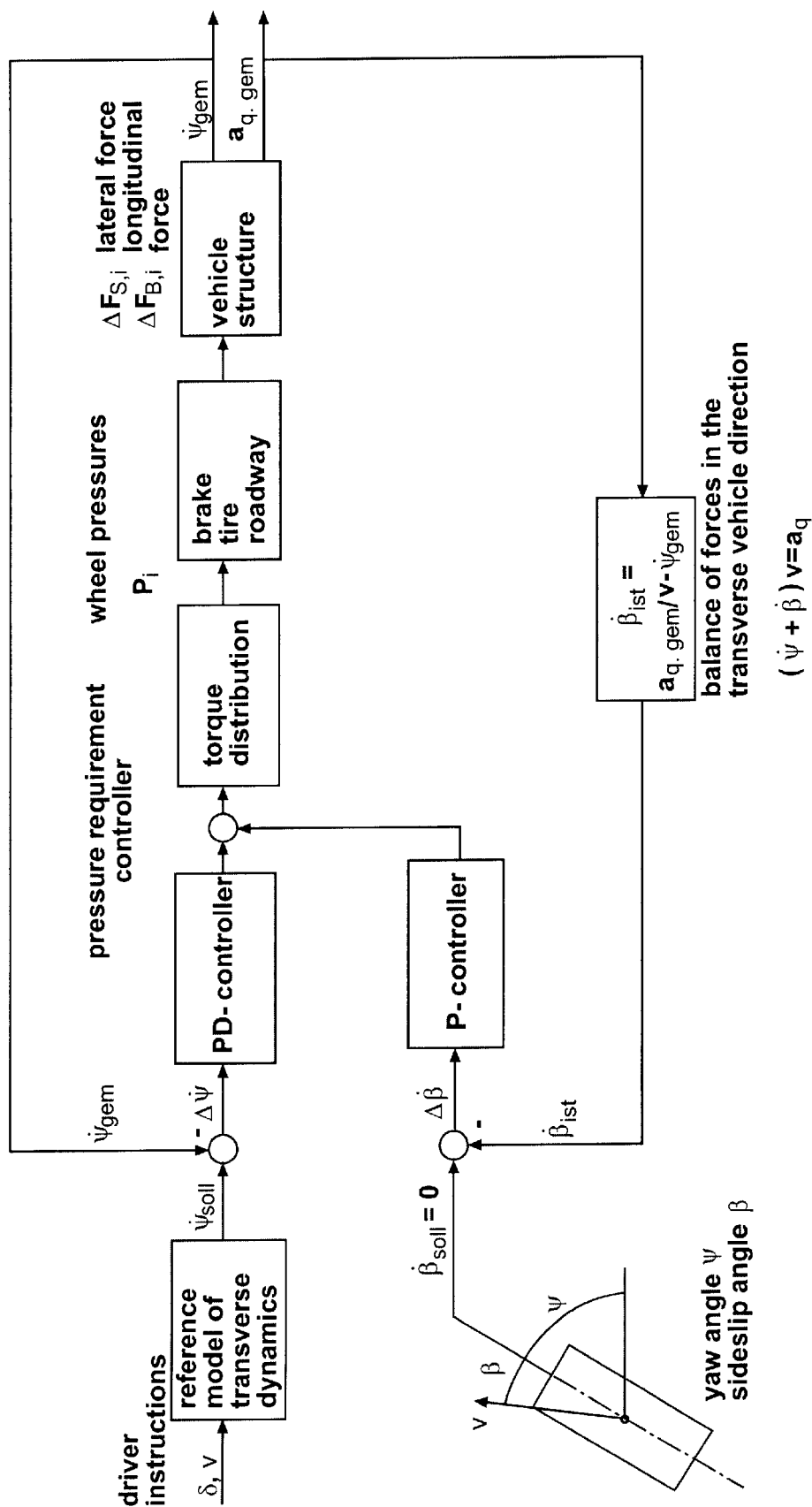
FIG. 2 shows the ESP concept according to the present invention.

The basic elements of the ESP control circuit can be taken from FIG. 2. The total output quantity $M_G$ of the PD-controller (yaw rate $\dot{\psi}$) and P-controller (sideslip angle speed $\dot{\beta}$) is determined in the following way:

$$M_G = K_{\dot\psi} \text{sign}(\Delta\dot\psi)(|\Delta\dot\psi| - \Delta\dot\psi_{Out}) + K_\psi \text{sign}(\Delta\psi)(|\Delta\psi_{Out}|) + K_\beta \text{sign}(\dot\beta_{Fhz})(|\dot\beta_{Fhz}| - \dot\beta_{Out})$$

wherein $$\Delta\dot\psi = \dot\psi_{Fhz} - \dot\psi_{Soll} \quad \Delta\psi = \psi_{Fhz} - \psi_{Soll} \tag{1}$$

The index Fhz designates the actual values of the yaw rate $\dot\psi$, yaw acceleration $\ddot\psi$ and sideslip angle speed $\dot\beta$ of the vehicle. The corresponding nominal values have been assigned the index 'Soll' (nominal). The control differences of the yaw rate and yaw acceleration which result from the difference between the actual values and nominal values are $\Delta\dot\psi$ and $\Delta\psi$. The exit control thresholds become apparent from the index 'out'. The amplification-factors of the PD controller ($K_{\dot\psi}$ and $K_\psi$) depend on the coefficient of friction between tire and road surface (linear approach), and the amplification factor of the P controller ($K_\beta$) depends on the degree of the stationary status of the vehicle movement.

2.2 Intervention Unit and Calculation of the Pressure Increase Requirement

The controller output quantity $M_G$ grows proportionally to the vehicle instability and, hence, also to the required yaw torque which is necessary for the desired stabilization of the vehicle. This yaw torque is imparted to the vehicle structure by a one-sided pressure increase in the actuators (wheel brakes). More specifically, the imparted brake torques effect on the wheels a brake force increase in the longitudinal direction of the vehicle and a decrease of lateral force in the transverse direction which generate the desired yaw torque when the operated wheels are appropriately selected. Thus, it is first of all necessary to determine the operated wheels for a defined control tendency of the vehicle (understeering or oversteering). In the event of an understeering vehicle, the curve-inward rear wheel and in the event of an oversteering driving behavior the curve-outward front wheel is selected for the pressure increase.

The magnitude of the necessary pressure increase $\Delta p_{auf}$ for the front axle is dictated by the relation $$\Delta p_{auf,v} = |M_G|, \quad (2)$$

that means the controller output quantity $M_G$ (see equation (1)), apart from the sign, is physically already a pressure. The defining equation for the rear axle reads as follows:

$$\Delta p_{auf,h} = K_{Br}|M_G|, \quad (3)$$

The gradient for the conversion of a brake cylinder pressure into a brake force is not equal for the front and the rear axles. This circumstance is taken into account by the factor $K_{Br}$ which is calculated in the following manner:

$$K_{Br} = \frac{A_{K,v}\, r_{w,v}\, C_v^*}{A_{K,v}\, r_{w,h}\, C_h^*} \quad (4)$$

In this equation:

$A_K$ is the brake piston surface $r_w$ is the effective brake radius $C^*$ is the brake constant.

It was assumed in equation (4) that both the coefficient of friction of the brake lining/brake surface pair and the tire radii of the front and rear axles are equal. The pressure increase calculated in equation (2) and (3), respectively, is equal to the pressure requirement $p_{auf}$ to be predefined as absolute in the unbraked case, i.e., for the initial pressure zero. For the braked case, however, there is already an initial pressure in all wheel brakes which must be taken into consideration for the pressure increase of the ESP. Therefore, the pressure requirement is determined in the following way:

$$p_{auf} = p_{ref} + \Delta p_{auf} \quad (5)$$

The pressure $p_{ref}$ is a reference pressure starting from which pressure increase is effected. This pressure equals the actual pressure of the wheel that undergoes pressure increase during control intervention (value is stored), and a compensation of outer limiting quantities is effective during the control operation. In this arrangement, pressure increases on the opposite wheel of the same axle are sensed which were caused, for example, by increasing the driver's initial pressure or raising the ABS control level (due to a change in the coefficient of friction, or similar events). The unbraked case is referred to in equation (5) for $p_{ref}=0$.

2.3 Limitation of the Pressure Requirement by the Slip Controller

When the pressure requirement $P_{auf}$ and the resulting pressure in the wheel brake cylinder is continuously increased, the corresponding wheel will initially reach the slip range of the maximum coefficient of friction in the longitudinal direction of the vehicle. Up to this point, brake force is built up in the longitudinal direction, on the one hand, and cornering force is decreased, on the other hand. Further pressure increase will no longer effect an essential increase of the brake force in the following, however, the cornering force will continue to be reduced, that means further increase of the pressure is expedient also in this range and is therefore carried out. However, this effect is bound to limits in the presence of major slips (greater than 80%), where only a small decrease of cornering force can still be detected. For this reason and in order to prevent locking of the wheel which minimizes comfort, the pressure requirement is limited to a defined level.

This level is fixed by a slip controller. The said controller in the background constantly calculates, in consideration of the actual slip measured on the wheel, a nominal pressure $p_{slip}$ in the wheel cylinder which would lead to a nominal slip of 50% (FIG. 1). When this pressure $P_{slip}$ is lower than the pressure requirement $P_{auf}$ defined in equation (5), $p_{slip}$ becomes the new pressure requirement $P_{auf}$. Due to the control quality of the slip controller, preferably a slip band of approximately 30 to 70% will occur in this operating range.

The slip controller described in this paragraph is used for the unbraked and the braked case.

Figure 3:
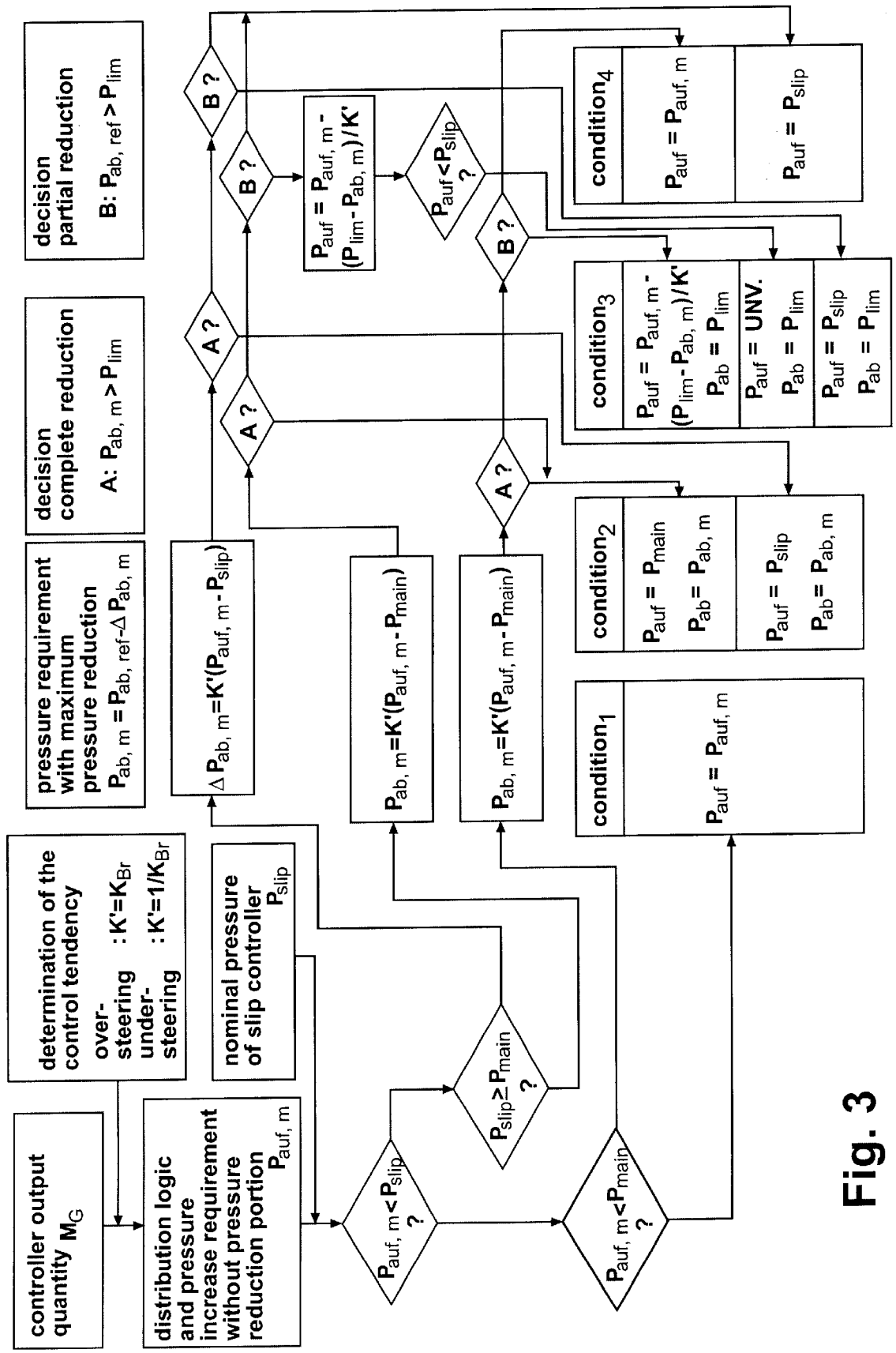
FIG. 3 is a flow chart of the influencing cycles for the ESP intervention in the actively braked case with pressure reduction according to the present invention.

3. ESP—INTERVENTION STRATEGY IN THE ACTIVELY BRAKED CASE WITH PRESSURE REDUCTION 3.1 Intervention Unit The first element of the device and/or the method of the present invention includes the appropriate selection of the operated wheels for the pressure increase and pressure reduction for a given control tendency of the vehicle (FIG. 3 shows the elements of the influencing cycles or the influencing strategy in a flow chart). Exactly as in the ESP intervention, pressure increase is effected without pressure reduction in the case of oversteering on the curve-outward front wheel and in the case of understeering on the curve-inward rear wheel. The respectively diagonally positioned wheel is used for the pressure reduction, that means the curve-outward front wheel in the case of understeering and the cuve-inward rear wheel in the case of oversteering. Basically the cornering force of the wheel is increased and the brake force reduced by the pressure reduction so that the resulting torque portions will generate a stabilizing total torque with the selection as mentioned above. A summary of the selection of the operated wheels is shown in the following table.

| Control tendency | operated wheel | pressure modulation |
|---|---|---|
| over-steering | curve-outward front wheel | pressure increase |
| | curve- | pressure |

|  | inward rear wheel | reduction |
|---|---|---|
| under-steering | curve-inward rear wheel | pressure increase |
|  | curve-outward front wheel | pressure reduction |

3.2 Calculation of the Pressure Requirements for Pressure Increase and Pressure Reduction Both the pressure increase requirement $p_{auf}$ and the pressure reduction requirement $\Delta p_{ab}$ must take into account the existing initial pressure level (actual brake pressure). Therefore, with the pressure increase in the increase case $\Delta p_{auf}$ and the pressure reduction $\Delta p_{ab}$ in the reduction case, the defining equations of the two pressure requirements read as follows:

$$p_{auf} = p_{auf,ref} + \Delta p_{auf} \quad (6)$$

and $$p_{ab} = p_{ab,ref} - \Delta p_{ab} \quad (7)$$

The reference pressures $p_{auf,ref}$ and $p_{ab,ref}$ essentially determine the mentioned initial pressure level. More specifically, $p_{auf,ref}$ equals the reference pressure in equation (5). The reference pressure $p_{ab,ref}$ equals the actual pressure of the reduction wheel when the control intervenes (also storage of this value), with pressure variations of the opposite wheel of the same axle being taken into consideration in the control.

The pressure requirements $P_{auf}$ and $P_{ab}$ according to equation (6) and (7) are limited towards the top and the bottom. The pressure requirement $P_{auf}$ is limited towards the top to the nominal pressure of the slip controller $P_{Slip}$ in order to prevent locking of the wheel and, simultaneously, utilize the maximal lateral force reduction (see in this respect section 2.3). In contrast thereto, the pressure reduction requirement $p_{ab}$ is limited towards the bottom to a limit pressure $P_{lim}$ in order to counteract the excessive cancellation of the braking effect on the wheel. The bottom limit pressure $P_{lim}$ is set to a constant value depending on the axle where the intervention takes place:

front axle: 15 bar rear axle: 5 bar

It is of course also possible to determine the limit pressure $P_{lim}$ variably, e.g. in response to the coefficient of friction and/or the driver's brake pressure.

As a next step, it is important to determine the pressure decline $\Delta p_{ab}$ and the pressure increase $\Delta p_{auf}$ from the controller output quantity $M_G$ (see equation (1)). Because both portions may become effective simultaneously, the controller output quantity $M_G$ must be shared between these two in a suitable fashion:

$$M_G = M_{G,auf} + M_{G,ab}. \quad (8)$$

The determination of $\Delta p_{auf}$ from $M_{G,auf}$ is done according to equation (2). or (3). To the portion $\Delta p_{ab}$ applies accordingly for the front axle (case of understeering)

$$\Delta p_{ab,v} = |M_{G,ab}|. \quad (9)$$

and accordingly for the rear axle (case of oversteering):

$$\Delta p_{ab,h} = K_{Br}|M_{G,ab}| \quad (10)$$

In compliance with the basic idea of the distribution strategy, only the pressure increase portion $\Delta p_{auf}$ and thus the pressure increase requirement $p_{auf}$ according to equation (6) is increased up to maximally the driver's initial pressure in a first influencing cycle or a first step (of four cycles or steps in total). In this phase, pressure is not yet reduced on the diagonally disposed wheel so that cancellation of the braking effect on this wheel does not either occur.

When in the presence of a high controller output quantity $M_G$ the pressure requirement $p_{auf}$ calculated therefrom reaches the driver's initial pressure $p_{main}$, then the pressure increase is limited to the driver's initial pressure in the second influencing cycle or the second step and, in addition, the pressure reduction on the diagonally positioned wheel is activated. More specifically, the pressure reduction portion $\Delta p_{ab}$ is determined from the remaining portion of the controller output quantity $M_G$. The following defining equation for the pressure reduction can be derived from equation (9) and/or (10), in consideration of equation (8) after evaluation of equation (2) and/or (3) and equation (6) for the driver's initial pressure $p_{main}$:

$$\Delta p_{ab,m} = K'(p_{auf,m} - p_{main}) \quad (11)$$

For the rear axle (oversteering intervention)

$$K' = K_{Br} \quad (12)$$

and for the front axle (understeering intervention)

$$K' = 1/K_{Br}. \quad (13)$$

The maximum pressure increase requirement $p_{auf,m}$ in equation (11) is the value which would result without pressure reduction for the front axle pursuant $$p_{auf,m} = p_{auf,ref} + |M_G| \quad (14)$$

and for the rear axle pursuant $$p_{auf,m} = p_{auf,ref} + K_{Br}|M_G| \quad (15)$$

that means, the value is calculated with the complete controller output quantity $M_G$. In the second influencing cycle or the second step, the pressure requirement $p_{ab}$ according to equation (7) which results from the pressure reduction portion according to equation (11) remains, however, greater than the bottom limit pressure $p_{lim}$ so that the pressure reduction portion can also be decreased completely. Because the pressure increase requirement in the second influencing cycle or the second step is equal to the driver's initial pressure, the inlet valve of the corresponding wheel may remain open in full extent, beside the separating valve and the switch-over valve, whereby further improvement of pedal comport is reached. The second influencing cycle or the second step may also be achieved when the nominal pressure of the pressure controller $p_{slip}$ is lower than the driver's initial pressure $p_{main}$. In this event, $p_{auf}$ is limited to $p_{slip}$ already before $p_{main}$ is reached. The reduction portion for the diagonally positioned wheel is then calculated analogously according to the relation $$\Delta p_{ab,m} = K'(p_{auf,m} - p_{slip}) \quad (16)$$

However, the inlet valve will not remain non-energized in this case.

In the third influencing cycle or the third step, the calculated reduction requirement $p_{ab}$ according to equations (7) and (11) is lower than the bottom limit pressure $p_{lim}$, so that the requirement is limited to the value of $p_{lim}$. The controller output quantity $M_G$ is not yet converted completely by the pressure increase on the wheel in the pressure buildup until $p_{main}$ and the pressure reduction on the wheel in the pressure decrease. Comfort must be put last in favor of a sufficient vehicle stabilization in this situation, that means the remaining portion of the controller output quantity $M_G$ which cannot be realized by the pressure decrease must be used for the active pressure increase in excess of the driver's initial pressure $p_{main}$. The result is energization of the separating valves and the switch-over valves of the circuit during pressure increase. The pressure requirement of the wheel during pressure increase $p_{auf}$ can be determined according to the relation $$p_{auf} = p_{auf,m} - (p_{lim} - p_{ab,m})/K' \qquad (17)$$

with K' according to equation (12) or (13), respectively. The requirement $p_{auf,m}$ is calculated from equation (14) or (15), respectively, and $p_{ab,m}$ is calculated from equations (7) and (11). If the pressure increase has already been limited by the slip controller to the amount of $p_{slip}$ before the driver's initial pressure $p_{main}$ is reached in the third step, further pressure increase is no longer possible, that means the effectiveness of the total intervention has reached its limits already. The energization of the separating and change-over valves will again be omitted in this case.

The fourth influencing cycle or the fourth step is reached if not only a partial pressure reduction is possible, i.e., the initial pressure is lower than the bottom limit pressure $p_{lim}$ already prior to the commencement of control. The reference pressure $p_{ab,ref}$ is used as a comparison value for the initial pressure. Thus, the pressure requirement on the wheel during pressure buildup is increased in excess of the driver's initial pressure $p_{main}$ according to equation (14) or (15), respectively, in this step so that the pressure modulation does not differ from the original case without pressure reduction. This means that the slip controller can likewise limit the pressure buildup to the amount $p_{slip}$ in the fourth influencing cycle or the fourth step.

All basic elements of the influencing cycles or the influencing strategies and their sequence are concludingly illustrated in a flow diagram in FIG. 3. After the controller output quantity and the control tendency are known, the operated wheels can be determined with respect to the intervention unit (see table 1). Initially, the pressure increase requirement $p_{auf,m}$ (cf. equation (14) or (15)) which would result without pressure decrease portion and the current nominal pressure of the slip controller $p_{slip}$ will be calculated. Thereupon, a distinction between cases with subsequent different course of calculation will commence which finally terminates in the assignment of the current condition 1, 2, 3 or 4. This determines the influencing cycles or strategies. First, it is decided whether the slip controller is active, that means, whether the pressure increase requirement would be limited by the slip controller.

If this is not the case ($p_{auf,m} < p_{slip}$) it is only required to check as another condition whether the pressure increase requirement is inferior to the driver's initial pressure $p_{main}$. When this condition is satisfied, the influencing cycle one, i.e., condition 1, prevails. In the negative, the pressure increase requirement must be calculated with a maximum pressure decrease (cf. equations (7) and (11)) as a first step. When the following decision whether the decrease may be effected completely (condition A: $p_{ab,m} > p_{lim}$) is positive, then influencing cycle two, i.e., condition 2, applies, and the final pressure requirements $p_{auf}$ and $p_{ab}$ can be determined. If condition A is not fulfilled, a decision will next be taken about whether at least a partial pressure reduction is possible. When the associated condition B ($p_{ab,ref} > p_{lim}$) is satisfied, a partial pressure decrease is possible, the influencing cycle three, i.e., condition 3, prevails and the pressure requirements can be calculated (pressure increase requirements cf. equation (17)). If condition B is not satisfied, decrease is impossible, and the influencing cycle four, i.e., condition 4, prevails.

When the slip controller is active, that is, $p_{slip}$ is lower than $p_{auf,m}$, it will first be decided whether $p_{slip}$ is greater than $p_{main}$. If this is not the case, the following decision and calculation structure is similar to the directly preceding case of the non-active slip controller and a pressure increase requirement in excess of $p_{main}$. Only the defining equation for the pressure decrease requirement with a maximum pressure decrease is now equation (16), and the final pressure requirement for the pressure buildup is always equal to $p_{slip}$. When the nominal pressure of the slip controller $p_{slip}$ is in excess of $p_{main}$, then equation (11) is again used for the defining equation of the maximum pressure reduction. When condition A in this branch is satisfied and, thus, the influencing cycle two, that means condition 2, prevails, then the pressure increase requirement is set equal to $p_{main}$, that means, the slip controller is no longer active then. When the calculated pressure reduction cannot be realized completely and condition B is positive, then the final pressure increase requirement $p_{auf}$, reduced by the reduction portion, will be initially calculated, and it is then checked whether the slip controller is still active. In the negative, $p_{auf}$ is the final pressure increase requirement in the influencing cycle three or condition 3, otherwise, the requirement is equal to $p_{slip}$.

An important element of pressure reduction in the second or third influencing cycle or in the condition 2 and 3 includes that the calculated pressure reduction is not performed within a time step of the controller, but is split up following a linear course over a defined number n of time steps (order: 5). This permits better controlling the buildup of the resultant yaw torque in a more moderate fashion. The condition is maintained during this period, that means, new detection is not carried out. The pressure reduction condition is terminated and new detection of the condition is admitted as soon as the mentioned period has lapsed, or the operated wheels, that means, the control tendency of the vehicle will change. In the second influencing cycle, i.e., in condition 2, the calculation of the pressure reduction requirement occurs within the mentioned n time steps for the time step i according to the following relation:

$$P_{ab,i} = P_{ab,ref} - \Delta P_{ab,m} \cdot i/n \text{ with } i=1, \ldots n \qquad (18)$$

The analog relation for the third influencing cycle, i.e., condition 3, means:

$$P_{ab,i} = P_{ab,ref} - (\Delta P_{ab,m} - (P_{lim} - P_{ab,m})) \cdot i/n \qquad (19)$$

The reference pressure $P_{ab,ref}$ is newly determined for each current loop also during an active influencing cycle or condition 2 or 3. This does not apply to the maximum pressure reduction requirement $P_{ab,m}$ and the maximum pressure reduction $\Delta P_{ab,m}$, i.e., the values from the last loop are used. The pressure reduction requirement $p_{ab,i}$ according to equations (18 and 19) is limited downwardly to the pressure $p_{lim}$.

The pressure increase requirement $P_{auf,m}$ and the nominal pressure of the slip controller $P_{slip}$ are adapted to the current input quantities in each time step also during the active pressure reduction phase. On the one hand, this is done because the slip controller must continue being active in the background to prevent locking of the operated wheel. On the other hand, an increase in the pressure buildup requirement must be possible, with the vehicle instability still rising, especially in the influencing cycle or condition 3 (no complete reduction possible and increase by way of the driver's initial pressure).

Figure 4:
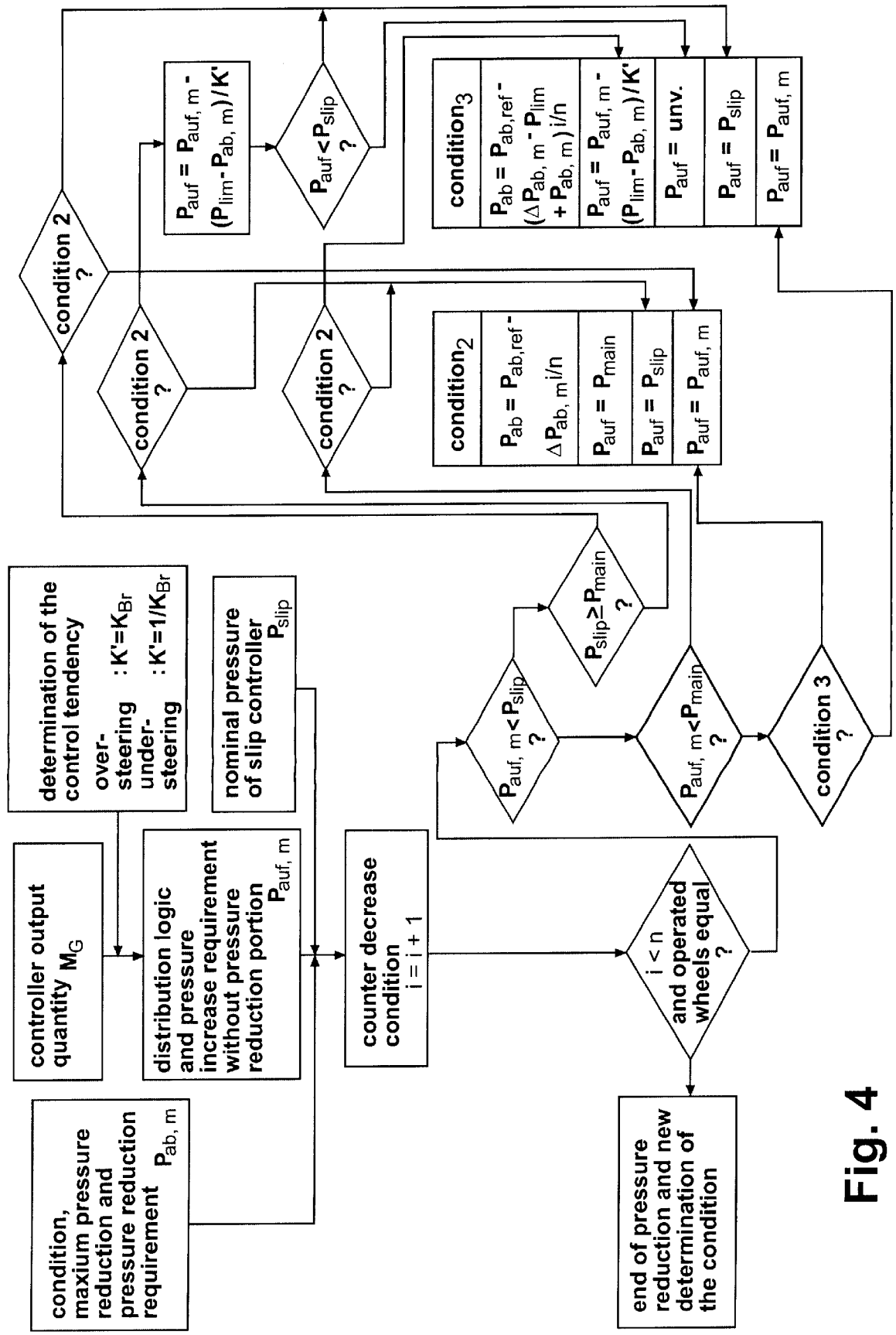
FIG. 4 is a flow chart of the influencing cycles two and three for the ESP intervention in the actively braked case with pressure reduction according to the present invention.

The entire run for the second and third influencing cycle or condition 2 and 3 will now be explained. Once an influencing cycle or condition 2 or 3 is detected according to FIG. 3, the pressure reduction requirement in this first time step will be calculated according to equation (18) or (19) (the final values of the linear decrease are mentioned already in FIG. 3). The sequence logic for the following second to nth time step or until the end of the pressure reduction condition is shown in FIG. 4. First, the controller output quantity for the current loop and the associated control tendency. is available as input quantities. From these quantities, the operated wheels are determined in the intervention unit and, further, the pressure increase requirement $P_{auf,m}$ calculated. Likewise, the nominal pressure of the slip controller $P_{slip}$ is conformed to the current slip behavior. The information about the condition, the maximum pressure reduction requirement $P_{ab,m}$ and the maximum pressure reduction $\Delta P_{ab,m}$ is taken from the last time step of the active pressure reduction. After upward counting of an activation counter i for the reduction condition it will be decided whether the pressure reduction is still active or new determination of the condition must take place (this will be done again according to FIG. 3). When the influencing cycle or condition 2 or 3 is still active, the pressure reduction requirement will be calculated corresponding to the counter i according to equations (18) or (19). The exact definition of the pressure reduction requirement is preceded by a determination of the pressure range which corresponds to that described in FIG. 2 in terms of the logic structure. The only exception is the case that, with an active pressure buildup condition, the pressure increase requirement will possibly drop below the driver's initial pressure due to a greatly decreasing instability of the vehicle, with the slip controller not active. In this case, the pressure increase requirement $P_{auf,m}$ is adopted, i.e., it may also drop below the driver's initial pressure $P_{main}$, both in the influencing cycle or condition 2 and in the influencing cycle or condition 3.

What is claimed is:

1. Vehicle stabilizing ESP device for modifying brake pressures on wheels of a vehicle according to input data, comprising:
   means for varying the brake pressure on at least one wheel in a way that influences an intervention unit that provides a number of influencing strategies, wherein the influencing strategies are defined by the brake pressure effected by the driver,
   wherein the intervention unit includes means for determining an additional torque ($M_G$) about the vertical axis of the vehicle from actual and nominal rotation data, means for determining a brake pressure apportioning in the case of pressure increase ($P_{auf}$) or pressure reduction ($P_{ab}$) on a front wheel or rear wheel, means to determine the actual brake pressure ($P_{ab,ref}$, $P_{auf,ref}$) and the driver brake pressure ($P_{main}$), and means for determining at least one top limit value ($p_{slip}$) and one bottom limit value ($P_{lim}$).

2. Vehicle stabilizing device as claimed in claim 1, wherein the intervention unit includes means for producing signals for a pressure requirement after a pressure reduction or pressure increase of the brake pressures, which pressure requirement effects a predetermined torque of the vehicle, and outputs corresponding control commands to the actuators.

3. Vehicle stabilizing device as claimed in claim 2, wherein the pressure requirement for the pressure increase is limited to a top value to which corresponds a maximum slip of approximately 80% slip on the wheel.

4. Vehicle stabilizing device as claimed in claim 2, wherein the pressure requirement for the pressure reduction is fixed to values for the bottom limit pressure $P_{lim}$ of generally bar for the front axle and generally 5 bar for the rear axle.

5. Vehicle stabilizing device as claimed in claim 2, wherein the pressure reduction is split up linearly over a defined number of time steps.

6. Vehicle stabilizing device as claimed in claim 1, wherein the intervention unit, in a first influencing cycle, outputs signals to one or more actuators for a pressure variation that effects the torque of the vehicle, wherein the signals effect a pressure increase up to, but not exceeding, the driver's initial pressure on at least one wheel.

7. Vehicle stabilizing device as claimed in claim 6, wherein the intervention unit further includes means for generating a second influencing cycle output signals to the actuators for a pressure variation that effects the torque of the vehicle, the said signals effecting a pressure increase up to maximally the driver's initial pressure on at least one wheel and a pressure reduction until minimally the bottom limit brake pressure on at least one other wheel.

8. Vehicle stabilizing device as claimed in claim 6, wherein the intervention unit, in a third influencing cycle, outputs signals to the actuators for influencing the torque of the vehicle, the signals effecting a pressure increase in excess of the driver's initial pressure on at least one wheel and a pressure reduction until minimally the bottom limit brake pressure on at least one other wheel.

9. Vehicle stabilizing device as claimed in claim 8, wherein the intervention unit, in a fourth influencing cycle, outputs signals to the actuators for influencing the torque of the vehicle, the signals effecting a pressure increase in excess of the driver's initial pressure on at least one other wheel.

10. Vehicle stabilizing device as claimed in claim 1, wherein the pressure increase or pressure reduction on the wheels are selected according to the following table

| control tendency | operated wheel | pressure modulation |
|---|---|---|
| over-steering | curve-outward front wheel | pressure increase |
|  | curve-inward rear wheel | pressure reduction |
| under-steering | curve-inward rear wheel | pressure increase |
|  | curve-outward front wheel. | pressure reduction |

11. Vehicle stabilizing method for modifying brake pressures on wheels of a vehicle according to input data, comprising the step of:
   varying the brake pressures on at least one wheel according to influencing cycles strategies determined as a function of driver brake pressure,
   wherein the brake pressure that effects a torque about the vertical axis of the vehicle, under the conditions
   $P_{auf,m} < P_{slip}$
   and
   $P_{auf,m} < P_{main}$
   wherein
      $P_{auf,m}$=maximum pressure increase requirement $P_{slip}$=top limit brake pressure $P_{main}$=driver brake pressure, is increased until $P_{auf}=P_{auf,m}$ in dependence on an oversteering or understeering driving behavior of the vehicle of the curve-outward front wheel or the curve-inward rear wheel.

12. Method as claimed in claim 11, wherein the brake pressure that effects a torque about the vertical axis of the vehicle, under the conditions $P_{auf,m} < P_{slip}$ and $P_{auf,m} < P_{main}$ wherein $P_{auf,m}$=maximum pressure increase requirement $P_{slip}$=top limit brake pressure $P_{main}$=driver brake pressure, is increased until $P_{auf}=P_{auf,m}$ in dependence on an oversteering or understeering driving behavior of the vehicle of the curve-outward front wheel or the curve-inward rear wheel.

13. Method as claimed in claim 11, wherein under the conditions $P_{ab,ref} > P_{lim}$ and $P_{ab,ref} < P_{main}$ wherein $P_{ab,ref}$=actual brake pressure of the pressure reduction wheel $P_{lim}$=bottom limit brake pressure $P_{main}$=driver brake pressure, the brake pressure on the curve-outward front wheel or on the curve-inward rear wheel is increased according to $$P_{auf}=P_{auf,m}-(P_{lim}-P_{ab,m})/K'$$

wherein $P_{auf}$=pressure increase requirement $P_{auf,m}$=maximum pressure increase requirement $P_{lim}$=bottom limit brake pressure $P_{ab,m}$=maximum pressure reduction requirement $K'$=gradient for the brake pressure apportioning between front and rear wheel in excess of the driver brake pressure $p_{main}$ until maximally $P_{slip}$, and the brake pressure on the wheel arranged diagonally to the pressure increase wheel is lowered to $P_{ab}=P_{lim}$ wherein $P_{ab}$=pressure reduction requirement $P_{lim}$=bottom limit brake pressure.

14. Method as claimed in claim 11, wherein, the pressure requirement for the pressure increase is limited to a top value ($P_{slip}$) to which corresponds a maximum slip of approximately 80% slip on the wheel.

15. Method as claimed in claim 11, wherein the pressure requirements for the pressure reduction in dependence on the front or rear axle of the vehicle where the intervention is effected are fixed to preferably constant values for the bottom limit pressure $P_{lim}$.

16. Method as claimed in claim 11, wherein the pressure reduction is apportioned linearly over a defined number of n time steps.

17. Method as claimed in claim 16, wherein the pressure reduction requirement for the time step i is determined according to the relation $$P_{ab,i}=P_{ab,ref}-\Delta P_{ab,m}{}^{i/n} \text{ wherein}=1,\ldots,n$$

during the second influencing cycle and according to the relation $$P_{ab,i}=P_{ab,ref}-\Delta P_{ab,m}-(P_{lim}-P_{ab,m}))^{i/n}$$

during the third influencing cycle.

18. Vehicle stabilizing ESP device for modifying brake pressures on wheels of a vehicle according to input data, comprising:

means for varying the brake pressure on at least one wheel in a way that influences an intervention unit that provides a number of influencing strategies, wherein the influencing strategies are defined by the brake pressure effected by the driver, wherein the pressure increase or pressure reduction on the wheels are selected according to the following table

| control tendency | operated wheel | pressure modulation |
|---|---|---|
| over-steering | curve-outward front wheel | pressure increase |
|  | curve-inward rear wheel | pressure reduction |
| under-steering | curve-inward rear wheel | pressure increase |
|  | curve-outward front wheel. | pressure reduction |

19. Vehicle stabilizing method for modifying brake pressures on wheels of a vehicle according to input data, comprising the step of:

varying the brake pressures on at least one wheel according to influencing cycles strategies determined as a function of driver brake pressure, wherein the brake pressure that effects a torque about the vertical axis of the vehicle, under the conditions $P_{auf,m} < P_{slip}$ and $P_{auf,m} \geq P_{main}$ or $P_{auf,m} \geq P_{slip}$ and $P_{slip} \geq P_{main}$ or $P_{auf,m} \geq P_{slip}$ and $P_{slip} < P_{main}$, wherein $P_{auf,m}$=maximum pressure increase requirement $P_{slip}$=top limit brake pressure $P_{main}$=driver brake pressure, and under the condition $P_{ab,ref} \leq P_{lim}$ wherein $P_{ab,ref}$=actual brake pressure of pressure reduction wheel $P_{lim}$=bottom brake pressure, is increased until $P_{auf}=P_{auf,m}$ and for $P_{auf,m} \geq P_{slip}$ until $P_{slp}$ in dependence on an oversteering or understeering driving behavior of the vehicle of the curve-outward front wheel or the curve-inward rear wheel.

20. Vehicle stabilizing method for modifying brake pressures on wheels of a vehicle according to input data, comprising the step of:

varying the brake pressures on at least one wheel according to influencing cycles strategies determined as a function of driver brake pressure wherein the brake pressure that effects a torque about the vertical axis of the vehicle, under the condition $P_{auf,m} < P_{slip}$ and $P_{auf,m} \geq P_{main}$ or $P_{auf,m} \geq P_{slip}$ and $P_{slip} \geq P_{main}$ or
$P_{auf,m} \geq P_{slip}$ and $P_{slip} < P_{main}$,
wherein
- $P_{auf,m}$=maximum pressure increase requirement
- $P_{slip}$=top limit brake pressure
- $P_{main}$=driver brake pressure, is increased in dependence on an oversteering driving behavior of the vehicle on the curve-outward front wheel until $P_{auf} = P_{main}$
or is limited to
$P_{auf} = P_{slip}$
when $P_{auf,m} \geq P_{slip}$ and $P_{slip} < P_{main}$ is satisfied and is lowered on the curve-inward rear wheel until
$P_{ab} = P_{ab,m}$
wherein
- $P_{ab}$=pressure decrease in the reduction case
- $P_{ab,m}$=maximum pressure reduction requirement.

21. Vehicle stabilizing method for modifying brake pressures on wheels of a vehicle according to input data, comprising the step of:
varying the brake pressures on at least one wheel according to influencing cycles strategies determined as a function of driver brake pressure,
wherein the brake pressure that effects a torque about the vertical axis of the vehicle, under the condition $P_{auf,m} < P_{slip}$ and $P_{auf,m} \geq P_{main}$
or
$P_{auf,m} \geq P_{slip}$ and $P_{slip} \geq P_{main}$
or
$P_{auf,m} \geq P_{slip}$ and $P_{slip} < P_{main}$,
wherein
- $P_{auf,m}$=maximum pressure increase requirement
- $P_{slip}$=top limit brake pressure
- $P_{main}$=driver brake pressure, is increased in dependence on an understeering driving behavior of the vehicle on the curve-inward rear wheel until $P_{auf} = P_{main}$
or is limited to
$P_{auf} = P_{slip}$
when $P_{auf,m} \geq P_{slip}$ and $P_{slip} < P_{main}$ is satisfied and is lowered on the curve-outward front wheel until
$P_{ab} = P_{ab,m}$
wherein
- $P_{ab}$=pressure decrease in the reduction case
- $P_{ab,m}$=the maximum pressure reduction requirement.

22. Vehicle stabilizing method for modifying brake pressures on wheels of a vehicle according to input data, comprising the step of:
varying the brake pressures on at least one wheel according to influencing cycles strategies determined as a function of driver brake pressure,
wherein under the conditions
$P_{ab,ref} > P_{lim}$ and $P_{ab,ref} \leq P_{main}$
wherein
- $P_{ab,ref}$=actual brake pressure of the pressure reduction wheel
- $P_{lim}$=bottom limit brake pressure
- $P_{main}$=driver brake pressure, the brake pressure on the curve-outward front wheel or on the curve-inward rear wheel is increased according to $$P_{auf} = P_{auf,m} - (P_{lim} - P_{ab,m})/K'$$

wherein
- $P_{auf}$=pressure increase requirement
- $P_{auf,m}$=maximum pressure increase requirement
- $P_{lim}$=bottom limit brake pressure
- $P_{ab,m}$=maximum pressure reduction requirement
- $K'$=gradient for the brake pressure apportioning between front and rear wheel in excess of the driver brake pressure $p_{main}$ until maximally $P_{slip}$, and the brake pressure on the wheel arranged diagonally to the pressure increase wheel is lowered to $P_{ab} = P_{lim}$
wherein
- $P_{ab}$=pressure reduction requirement
- $P_{lim}$=bottom limit brake pressure.

* * * * *

UNITED STATES PATENT AND TRADEMARK OFFICE
CERTIFICATE OF CORRECTION

PATENT NO. : 6,438,482 B1 Page 1 of 1
DATED : August 20, 2002
INVENTOR(S) : Mathias Baumann et al.

It is certified that error appears in the above-identified patent and that said Letters Patent is hereby corrected as shown below:

Column 11,
Line 22, change "$P_{ab,ref} < P_{main}$" to -- $P_{ab,ref} \leq P_{main}$ --

Column 12,
Line 53, change "$P_{auf} = P_{auf,m}$ and for" to -- $P_{auf} = P_{auf,m}$, and for --
Line 62, change "of driver brake pressure" to -- of diver brake pressure, --.
Line 65, change "$P_{aufm} \geq P_{main}$" to -- and $P_{auf,m} \geq P_{main}$ --.

Signed and Sealed this

Fourth Day of February, 2003

JAMES E. ROGAN
*Director of the United States Patent and Trademark Office*